(12) United States Patent
Righi et al.

(10) Patent No.: US 7,421,688 B1
(45) Date of Patent: Sep. 2, 2008

(54) METHODS AND SYSTEMS FOR UPDATING THE FIRMWARE ON A PLURALITY OF NETWORK-ATTACHED COMPUTING DEVICES

(75) Inventors: Stefano Righi, Lawrenceville, GA (US); Brian Richardson, Loganville, GA (US); Jerry Petree, Alpharetta, GA (US)

(73) Assignee: American Megatrends, Inc., Norcross, GA (US)

( * ) Notice: Subject to any disclaimer, the term of this patent is extended or adjusted under 35 U.S.C. 154(b) by 614 days.

(21) Appl. No.: 10/770,951

(22) Filed: Feb. 3, 2004

Related U.S. Application Data (60) Provisional application No. 60/450,039, filed on Feb. 26, 2003.

(51) Int. Cl.
G06F 9/44 (2006.01)
G06F 15/16 (2006.01)
G06F 15/177 (2006.01)

(52) U.S. Cl. .................. 717/172; 709/202; 709/221; 713/2

(58) Field of Classification Search .......... 717/168, 717/171, 172
See application file for complete search history.

(56) References Cited

U.S. PATENT DOCUMENTS

| | | | |
|---|---|---|---|
| 5,596,713 A * | 1/1997 | DeRoo et al. | 714/35 |
| 6,175,919 B1 | 1/2001 | Ha | |
| 6,266,809 B1 | 7/2001 | Craig et al. | |
| 6,438,688 B1 | 8/2002 | Nunn | |
| 6,640,334 B1 | 10/2003 | Rasmussen | |
| 6,732,267 B1 | 5/2004 | Wu et al. | |
| 6,970,917 B1 | 11/2005 | Kushwaha et al. | |
| 7,080,134 B2 * | 7/2006 | Doherty et al. | 709/221 |
| 7,293,169 B1 | 11/2007 | Righi et al. | |
| 2002/0002688 A1 | 1/2002 | Gregg et al. | |
| 2002/0129159 A1 * | 9/2002 | Luby et al. | 709/236 |
| 2003/0165230 A1 * | 9/2003 | Reuss | 379/265.02 |
| 2003/0204843 A1 | 10/2003 | Barmettler et al. | |
| 2004/0015952 A1 | 1/2004 | Lajoie et al. | |
| 2004/0181691 A1 | 9/2004 | Armingaud et al. | |

OTHER PUBLICATIONS

Harold, Elliotte, *Java Network Programming*, 2nd Edition, O'Reilly Publishing, sections 2.3 and 6.1 and Chapter 13, Jul. 2, 2000, 35 pages.

U.S. Official Action dated Jan. 16, 2007 in U.S. Appl. No. 10/711,245.

U.S. Official Action dated Jun. 29, 2007 in U.S. Appl. No. 10/711,245.

U.S. Official Action dated Feb. 5, 2008 in U.S. Appl. No. 10/711,245.

(Continued)

*Primary Examiner*—Eric B Kiss
(74) *Attorney, Agent, or Firm*—Hope Baldauff Hartman, LLC (57) ABSTRACT

Methods and systems are provided for updating firmware on a plurality of networked computing devices via a distributed network. An instruction to update the firmware on a plurality of networked computing devices, such as nodes in a computer cluster, is sent from a manager computer to the computing devices monitoring for instructions. When the instruction is received, the computing devices transition to an operating system independent recovery state, receive a new firmware image over the distributed network, and update the firmware with the new firmware image.

25 Claims, 4 Drawing Sheets

OTHER PUBLICATIONS

U.S. Official Action dated May 16, 2006 in U.S. Appl. No. 10/711,016.
U.S. Official Action dated Nov. 2, 2006 in U.S. Appl. No. 10/711,016.
U.S. Official Action dated Apr. 20, 2007 in U.S. Appl. No. 10/711,016.
U.S. Notice of Allowance/Allowability dated Jun. 28, 2007 in U.S. Appl. No. 10/711,016.
U.S. Appl. No. 10/770,245 filed Feb. 3, 2004, entitled "Methods and Systems for Updating and Recovering Firmware Within a Computing Device Over a Distributed Network" Righi et al.

* cited by examiner

METHODS AND SYSTEMS FOR UPDATING THE FIRMWARE ON A PLURALITY OF NETWORK-ATTACHED COMPUTING DEVICES

CROSS REFERENCE TO RELATED APPLICATIONS

The present application claims priority under 35 U.S.C. § 119 to U.S. provisional application No. 60/450,039 entitled "Methods and Systems For Updating a Computer Basic Input/Output System Over a Distributed Computing Network," filed on Feb. 26, 2003 now abandoned, and which is expressly incorporated herein by reference.

TECHNICAL FIELD

The present invention is related to remote management features of a computer system. More particularly, the present invention is related to remotely updating the firmware on a plurality of computing devices via a network.

BACKGROUND OF THE INVENTION

Reducing the time and labor of update or recovery operations on server and/or client computers is an ongoing objective of network administrators and computer system manufacturers. In many modern computer systems, the firmware, such as the basic input/output system ("BIOS"), is stored as groups of memory blocks in one or more re-programmable memory devices. These re-programmable memory devices, typically known as "flash" parts, are a type of non-volatile random access memory ("NVRAM") that allows the firmware BIOS to be recovered or updated by using software to erase and program each flash part.

Previous methods for maintaining firmware stored on the flash memory of a computer system require a video display and input device connected to the computer to be updated and direct contact with the computer to be updated through the display and input device. In one method, the firmware in previous systems is maintained by utilizing an application program that utilizes files containing the updated firmware stored on a local device or available through a serial port connection. In the alternative, a BIOS image update may occur in previous systems through a program provided within the BIOS. While both of these methods for updating the firmware of a computer system work well when a display and/or keyboard are available and when physical access to the computer may be had, headless computers, server computers within server farms, and nodes of a computer cluster are usually without a console and are remotely operated.

Removing the need to physically operate each computer in preparation to execute a routine maintenance procedure for an image of the firmware is especially critical for headless or remote computers that need updating without utilizing a display, keyboard, or floppy drive. For instance, manually providing a new BIOS image for each computer in a server farm and/or large-scale computer clusters can take an excessive amount of time and administrative labor. Furthermore, updates that occur on various network attached computers having various operating systems become even more complex, potentially requiring a different update procedure for each computer depending on the computer's operating system manufacturer or version.

It is with respect to these considerations and others that the present invention has been made.

SUMMARY OF THE INVENTION

In accordance with the present invention, the above and other problems are solved by methods and systems for updating firmware, such as the BIOS, within a plurality of computing devices, such as computer cluster nodes, over a distributed network. According to one method for updating firmware on a plurality of computing devices, an instruction to begin a firmware maintenance procedure is received over the distributed network at the computing devices. In response to receiving the instruction, the computing devices are transitioned to an operating system "OS" independent recovery state. Once in the recovery state, the computing devices receive a new firmware image over the distributed network. In response to receiving the new firmware image, the current firmware on each of the computing devices is updated with the new firmware image.

Another embodiment of the present invention is a system for updating the firmware on a plurality of networked computers over a network. The system includes a manager computer and other networked computers. The manager computer is operative to send an instruction to update the firmware of the networked computers over the network. The manager computer is also operative to receive notifications of readiness for update from the networked computers. In response to receiving the notifications of readiness, the manager computer is further operative to send a new firmware image over the network to the networked computers.

Each of the other networked computers is operative to monitor a communications port for the instruction to update the firmware. In response to receiving the instruction, the networked computers transition to an OS independent recovery state. Further, in response to transitioning to the recovery state, the networked computers send notifications of readiness to the manager computer over the network. Next, in response to sending the notifications of readiness, the networked computers receive the new firmware image and update a current firmware with the new firmware image.

Aspects of the invention may be implemented as a computer process, a computing system, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION

As described briefly above, embodiments of the present invention provide methods and systems for updating the firmware of a plurality of network attached computing devices over a distributed network. In the following detailed description, references are made to accompanying drawings that form a part hereof, and in which are shown by way of illustration specific embodiments or examples. These embodiments may be combined, other embodiments may be utilized, and structural changes may be made without departing from the spirit and scope of the present invention. The following detailed description is, therefore, not to be taken in a limiting sense, and the scope of the present invention is defined by the appended claims and their equivalents.

Figure 1:
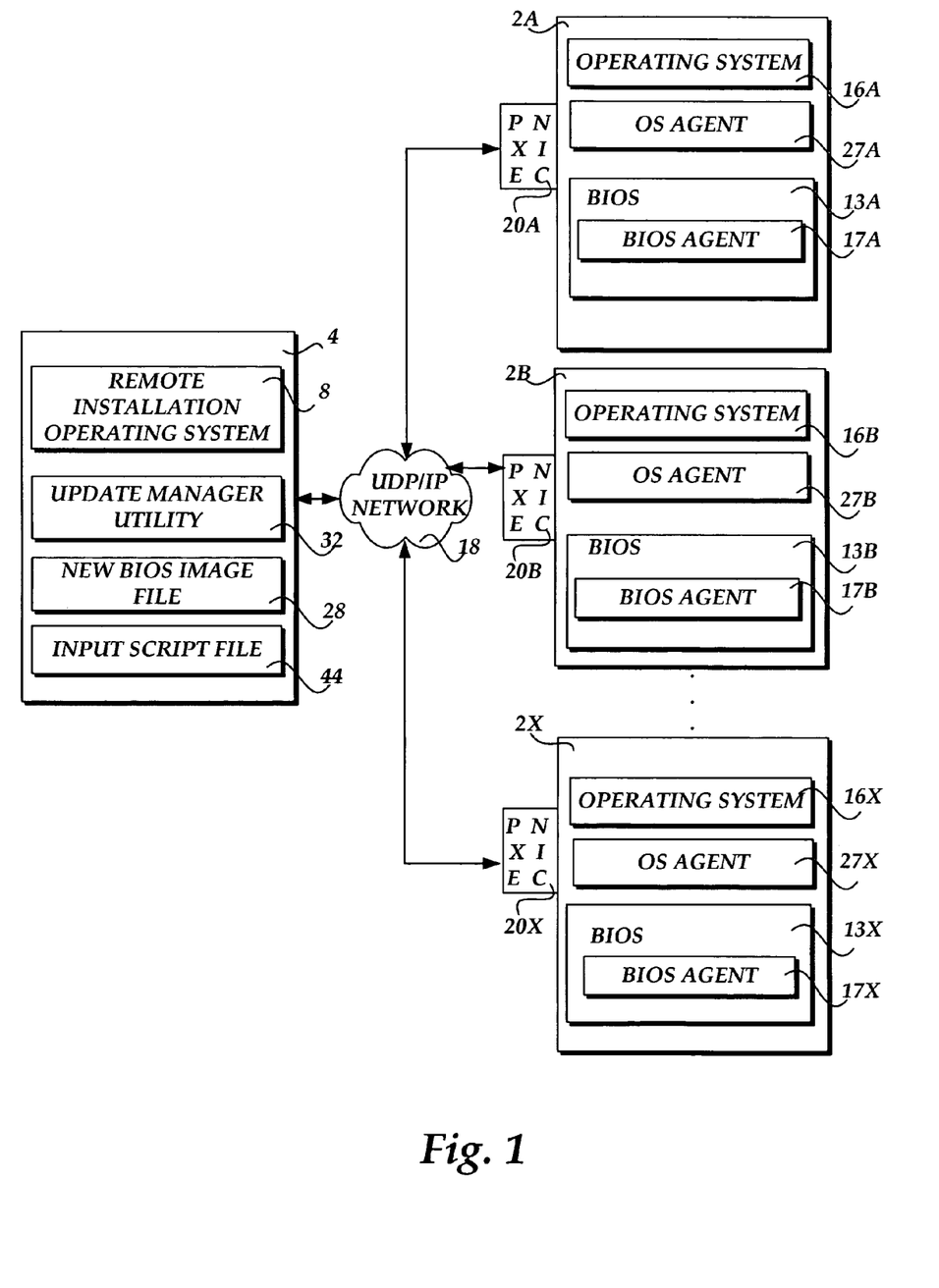
FIG. 1 is a schematic diagram illustrating aspects of a computer cluster network utilized in an embodiment of the invention.
Figure 2:
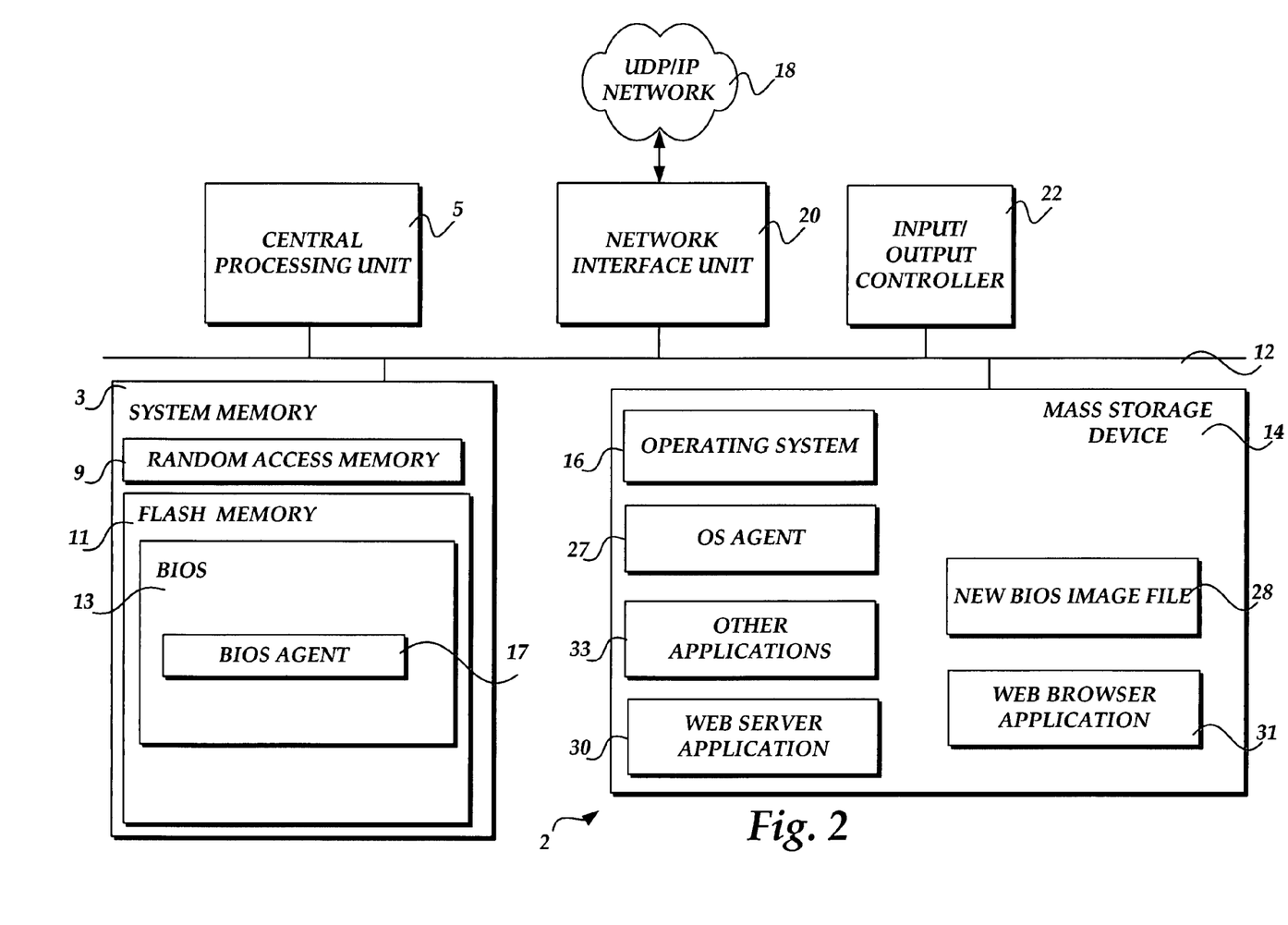
FIG. 2 illustrates a computer system architecture for a node computer utilized in embodiments of the invention.
Figure 3:
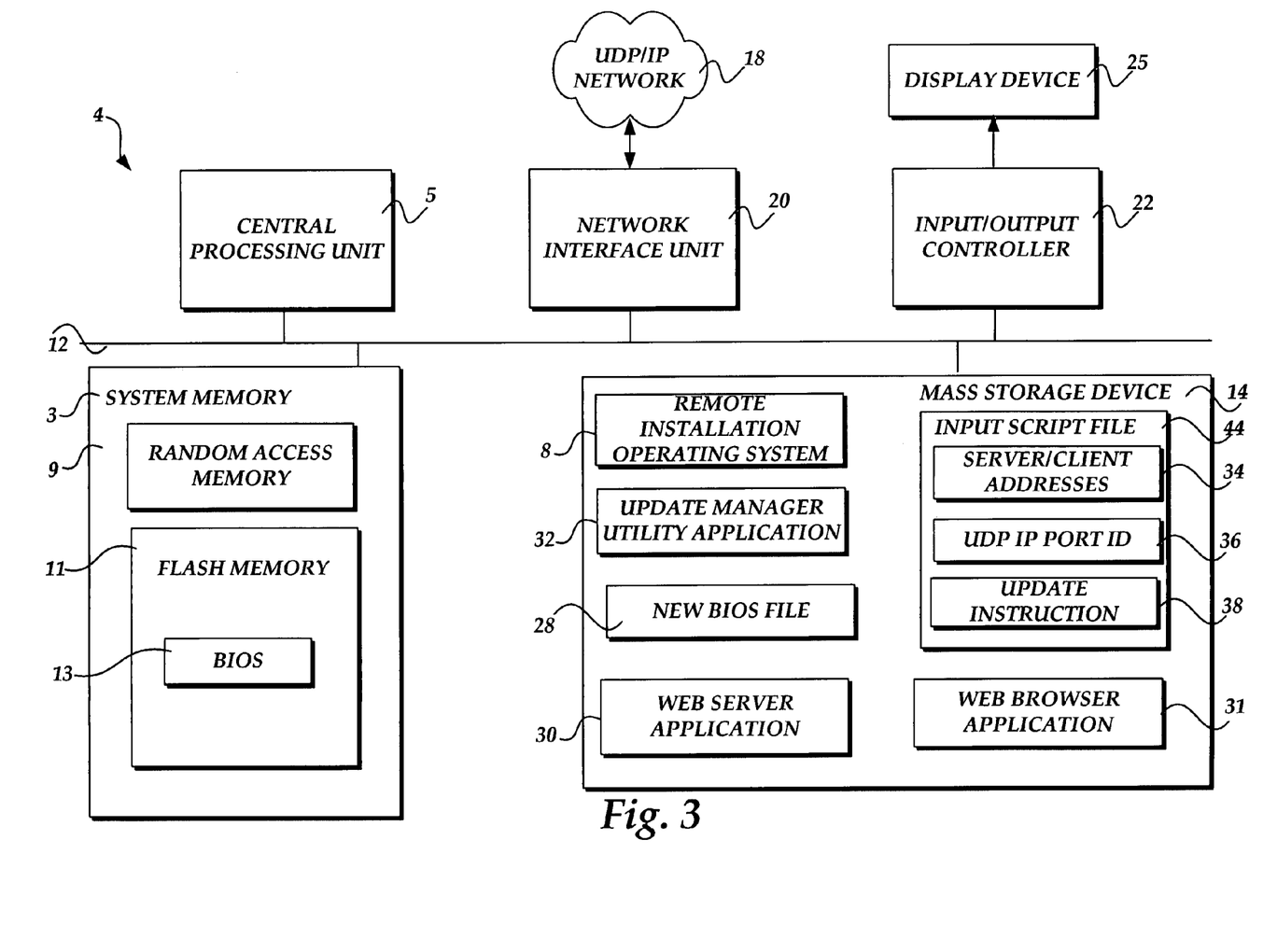
FIG. 3 illustrates a computer system architecture for a manager computer utilized in embodiments of the invention.

Referring now to the drawings, in which like numerals represent like elements through the several figures, aspects of the present invention and the exemplary operating environment will be described. FIGS. 1-3 and the following discussion are intended to provide a brief, general description of a suitable computing environment in which the embodiments of the invention may be implemented. While the invention will be described in the general context of program modules that execute in conjunction with a BIOS program that executes on a personal or server computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 1, a system for updating and the firmware multiple computing devices, such as nodes of a computer cluster, over a network will be described. As shown in FIG. 1, the system includes a manager computer 4. The manager computer 4 comprises a standard personal or server computer operative to execute an update manager utility application 32, which operates in conjunction with input script file 44 to send update instructions to remote and or network attached computers, represented by the network attached computers 2A-2X, over the network 18. As will be described in greater detail below with respect to FIG. 3, the input script file 44 contains data that assists the update manager utility application 32 in identifying the remote computers 2A-2X that should be updated and the communication ports of the remote computers designated for listening to or monitoring instruction activity.

The manager computer 4 is connected to a network 18, such as a LAN, WAN, or other type of distributed computing network, such as the Internet, that supports the user datagram protocol/Internet protocol ("UDP/IP"). It should be appreciated, however, that the manager computer 4 may be configured for communication over other types of networks including wireless networks. Alternatively, the manager computer 4 may comprise another type of computing device operative to access the network 18, such as a personal digital assistant or other type of computer.

The manager computer 4 also includes a new BIOS image file 28 for use in updating the BIOS 13A-13X of the computers 2A-2X over the network 18. The BIOS image file 28 may be a copy or an updated version of the BIOS 13A-13X. Updates to the BIOS 13A-13X utilizing the BIOS image file 28 may be performed in order to update the BIOS 13A-13X after the BIOS version has been changed, erased, or corrupted. In particular, the BIOS image file 28 is remotely sent from the manager computer 4 over the network 18 to the memory of the network attached computers 2A-2X that receive an update instruction from the manager computer 4.

Additionally, the manager computer 4 includes an operating system 8 equipped with remote installation services for installing the BIOS image file 28 in the memory of the network attached computers 2A-2X over the network 18. The remote installation services are utilized in a Pre-Boot Execution Environment ("PXE"). (pronounced "pixie"). PXE is one component of the wired for management (WFM) specification promulgated by INTEL CORPORATION. PXE allows the network attached computers 2A-2X to boot from the manager computer 4 over the network 18 prior to booting the operating system 16 on the local hard drive of the network attached computer. A network interface card ("NIC") of a PXE-enabled computer, such as the NICs 20A-20X, is connected to the network 18 via a jumper, which keeps the computer connected to the network even when the power is off. Because a network administrator does not have to physically visit the specific network attached computer and manually boot it, operating systems and other software, such as diagnostic programs, can be loaded onto the computing device from a server, such as the manager computer 4, over a network, such as the network 18. PXE is a mandatory element of the WFM specification. To be considered compliant, the PXE must be supported by the computer's BIOS and its NIC.

The computers 2A-2X may comprise a network of standard desktop computers, a network of headless computers and/or a farm of server computers, a network of nodes in a computer cluster, routers, peer devices, or other common network nodes. The networked computers 2A-2X are connected to the network 18 and are operative to execute the OS agent applications 27A-27X, respectively. The OS agent applications 27A-27X operate in conjunction with the operating systems 16A-16X to monitor or "listen" on an assigned communication port, for instructions transmitted to the network-attached computers 2A-2X. The update manager utility 32 may send an update instruction over the network 18 to OS applications 27A-27X executing on networked attached computers and monitoring communication ports for instruction activity. Once an OS agent application, such as 27A, receives the update instruction from the update manager utility application 32, the OS agent application transitions the network attached computer to an OS independent recovery state while initiating a reboot of the network attached computer. An OS independent recovery state is an operating state where the OS is neither executing nor available. This transition allows for updates to the BIOS 13A-13X independent of the version or type of operating system 16A-16X each network attached computer 2A-2X executes.

Upon transitioning to the OS independent recovery state, control passes to a BIOS agent applications 17A-17X. The BIOS agent applications 17A-17X execute in the OS independent recovery state to send notifications of readiness to update over the network 18 to the manager computer 4. Upon receiving the notifications of readiness, the manager computer 4, via the remote installation services, sends the BIOS image file 28 over the network 18 to the PXE-enabled NIC 20 for installation within the memory of the network attached computers 2A-2X. For instance, the BIOS image file 28 may be transmitted in fragments from the manager computer 4 to the network attached computers 2A-2X, such as nodes in a computer cluster. It should be appreciated that large-scale computer clusters can have upwards of ten thousand or one hundred thousand nodes. In these environments, establishing point-to-point connection to update each node's BIOS is impractical. Thus, a single BIOS image file 28 is sent from the manager computer 4 in the form of a UDP broadcast such that the nodes receive the BIOS image 28 in parallel. Once the entire BIOS image file 28 has been received into the memory of a network attached computer 2A-2X, the update process is continued. For instance, when the entire BIOS image file 28 has been received, the BIOS agent applications 17A-17X execute instructions to erase and replace the current BIOSs 13A-13X with the BIOS image file 28. Additional details regarding transmission of the BIOS image file 28 fragments and remote firmware updates will be described below with respect to FIG. 4.

Referring now to FIG. 2, an illustrative computer architecture for a computing system 2 for practicing the various embodiments of the invention will be described. The computer architecture shown in FIG. 2 illustrates a conventional server, or personal computer 2, including a central processing unit 5 ("CPU"), a system memory 3, including a random access memory 9 ("RAM") and a flash memory 11, and a system bus 12 that couples the memory to the CPU 5.

A basic input/output system ("BIOS") 13 containing the basic routines that help to transfer information between elements within the computer, such as during startup, is stored in the flash memory 11. The BIOS 13 is the firmware program the CPU 5 uses to get the computer system started after it is powered on. During boot, the BIOS 13 also manages data flow between the OS 16 and attached devices such as a hard disk, video adapter, keyboard, mouse and printer.

The BIOS 13 is an integral part of the computer and comes with it from the manufacturer. In contrast, the OS can either be preinstalled by the manufacturer or vendor or installed by the user. The BIOS 13 is made accessible to the microprocessors on an erasable programmable read-only memory "EPROM" chip. When the computer 2 is powered on, the CPU 5 passes control to the BIOS program, which is always located at the same place on the flash memory 11.

When the BIOS 13 boots up the computer, it first determines whether all of the attachments are in place and operational and then it loads the OS, or key parts of it, into a computer's RAM from a hard disk or diskette drive. Sometimes changes can be made to the system configuration during BIOS setup. As described herein, in order to store the maximum amount of data on the flash memory 11, portions of the BIOS may be stored in a compressed format. The compressed portions are decompressed prior to execution by the CPU 5.

The network attached computer 2 further includes a mass storage device 14 for storing an OS 16 and OS-dependent application programs such as the OS agent application 27 for monitoring and responding to update instructions from the manager computer 4. Once received from the manager computer 4, the new BIOS image file 28 for updating the BIOS 13 may also be stored on the storage device 14. As discussed in greater detail below with respect to FIG. 4, upon receiving the new BIOS image file 28, the BIOS 13 is updated with the new BIOS image 28.

As mentioned briefly above, a number of program modules and data files may be stored in the mass storage device 14 and RAM 9 of the computer 2, including an operating system 16 suitable for controlling the operation of a networked personal or server computer, such as the WINDOWS XP operating system from MICROSOFT CORPORATION of Redmond, Wash., the LINUX operating system, DOS, and the Free BSD operating system. The network attached computer 2 may also be operative to execute a Web server application 30, a Web browser application 31, such as the INTERNET EXPLORER browser from MICROSOFT CORPORATION of Redmond, Wash., and other OS-dependent application programs 33 such as a word processing program. The mass storage device 14 is connected to the CPU 5 through a mass storage controller (not shown) connected to the bus 12. The mass storage device 14 and its associated computer-readable media, provide non-volatile storage for the computer 2. Although the description of computer-readable media contained herein refers to a data storage device such as a hard disk or CD-ROM drive, it should be appreciated by those skilled in the art that computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 18, such as a LAN, WAN, or a large scale distributed computing network such as the Internet. The computer 2 may connect to the network 18 through a network interface unit 20 connected to the bus 12. It should be appreciated that the network interface unit 20 may also be utilized to connect to other types of networks and remote computer systems, including wireless networks. The computer 2 may also include an input/output controller 22 for receiving and processing input from a number of devices, including a keyboard, mouse, or electronic stylus (not shown in FIG. 1). Similarly, an input/output controller 22 may provide output to a display screen, a printer, or other type of output device. It should be appreciated that the computer 2 may be a headless computer not utilizing or possessing display output or keyboard input capabilities. The computer 2 may also be without local floppy storage or serial port access.

Turning now to FIG. 3, an illustrative computer architecture for a manager computer 4 for practicing the various embodiments of the invention will be described. The computer architecture shown in FIG. 3 illustrates a conventional server or personal computer, including a CPU 5 and a system memory 3 containing components described above with respect to FIG. 2. The manager computer system 4 also includes a mass storage device 14 for storing an OS 8 equipped with remote installation services and application programs, such as the manager utility application 32 for initiating and sending update instructions from the manager computer 4 to the network attached computers 2A-2X. The mass storage device 14 may also store the BIOS image 28 and the input script file 44.

The manager utility application 32 utilizes the input script file 44 to send an update instruction to designated network attached computers. The input script file 44 stores the network addresses 34 of all the computers 2 that are to be updated, identifies the communication ports 36 monitored by the OS agent applications 27A-27X described above in FIGS. 1-2, and also includes the update instruction 38 transmitted to a network attached computer 2 to initiate an update. The manager computer 4 may also be operative to execute a Web server application 30 and a Web browser application 31 as described above in FIG. 2. Additionally, the manager computer may include a display device 25 for displaying update progress via a graphical user interface.

Figure 4:
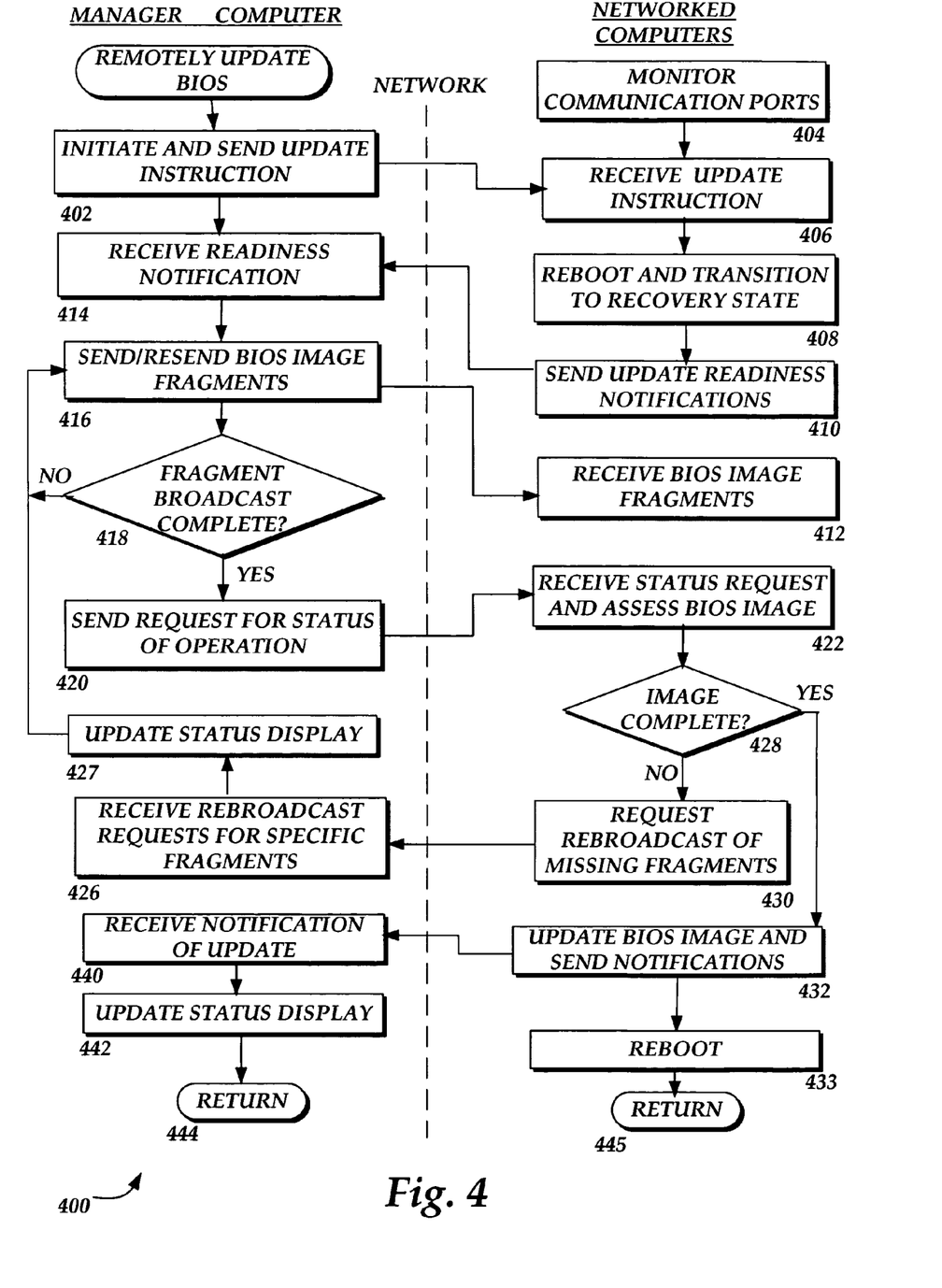
FIG. 4 illustrates an operational flow performed in updating the firmware of networked computers over a network according to an embodiment of the invention.

Turning now to FIGS. 1, 3, and 4, an illustrative operational flow 400 for updating the firmware of networked computers 2A-2X over the network 18 in response to an instruction from the manager computer 4 according to an embodiment of the invention will be described. It should be appreciated that the number of networked computers 2A-2X on the network 18 may vary from one up to and beyond one hundred thousand. The operational flow begins at operation 402 where the manager computer 4, initiates and sends an update instruction over the network 18 to the network attached computing devices, such as the computers 2A-2X. It should be appreciated that other protocols, such as transmission control protocol ("TCP/IP"), may be utilized to send the update instruction over the network 18 to the OS agent applications 27A-27X. The update instruction 38 requests an update to the BIOS, such as the BIOS 13A-13X, in a maintenance operation.

The manager computer 4 locates the network attached computers 2A-2X by determining the network addresses 34 of each computer 2A-2X. The manager computer 4 also determines the communication ports 36 that the OS agent applications 27A-27X are simultaneously monitoring at operation 404. The input script file 44 stored on the manager computer 4 contains the network addresses 34 of all the network attached computers available for update and the communication ports 36 that the OS agent applications 27, executing on each available computer, are monitoring. It should be appreciated that each OS agent application 27 utilizes only one communication port 36, occupies minimal system memory 3, and only consumes additional CPU 5 resources upon receiving the update instruction 38. The input script file 44 also contains the update instruction 38.

Next, the operational flow 400 continues from operations 402 and 404 to operation 406 where the update instruction is received by the OS agent applications 27A-27X at the network attached computers 2A-2X. In response to receiving the update instruction 38, the operational flow 400 continues to operation 408 where the recovery OS agent applications 27A-27X reboot the network attached computers 2A-2X and transition to a recovery state where the OS is neither executing or available.

The operational flow 400 then continues to operation 410 where the BIOS agent applications 17A-17X take control and send notifications of readiness to update to the manager computer 4 over the network 18. Next, the operational flow 400 continues to operation 414 where the manager computer 4 receives the notifications of readiness. In response to receiving the notifications of readiness, the operational flow 400 continues to operation 416 where the manager computer 4 sends the new BIOS image file 28 over the network 18 to the network attached computers 2A-2X. It should be appreciated that the BIOS image file may be sent in the form of broadcast fragments of a predefined length where each fragment is numbered. The operational flow 400 then asynchronously continues to operations 418 and 412.

At operation 412, broadcast packet fragments of the BIOS image file 28 are received at the computers 2A-2X. Meanwhile, at operation 418 a determination is made as to whether the complete image has been sent. If the complete image has not been sent, the operational flow 400 returns to operation 416 where additional fragments are sent until the broadcast is complete. Once the broadcast of the BIOS image file 28 has been completed, the operational flow continues to operation 420 described below.

Returning to operation 412, the BIOS agent applications 17A-17X continue to receive the broadcast packet fragments until the broadcast is complete. Meanwhile upon completion of the broadcast at operation 420 a request for status of the image broadcast is sent from the manager computer 4 to the computers 2A-2X. The operational flow 400 then continues from operation 420 to operation 422. At operation 422, the status request is received by the BIOS agent applications 17A-17X. The operational flow 400 then continues to operation 428.

At operation 428, the BIOS agent applications 17A-17X verify that a complete BIOS image 28 has been received. If the BIOS image is complete, the operational flow 400 continues from operation 428 to operation 432 described below. If the BIOS image 28 is incomplete, the operational flow 400 continues to operation 430. At operation 430, a request for the rebroadcast of missing fragments is sent to the manager computer 4. It should be appreciated that numbers of the missing fragments may be included in the request that is in the form of acknowledgement codes from the computers 2A-2X. The operational flow 400 then continues to operation 426 where the rebroadcast request is received at the manager computer 4. The manager computer 4 uses the acknowledgement codes from each BIOS agent application 17 to manage the update operation. Next, the operational flow 400 continues to operation 427 where a graphical status interface is updated to display the progress of update operations. The status display may be via the input/output controller 22 and display device 25 described above in FIG. 3. The operational flow 400 then returns to operation 416 where the missing fragments of the BIOS image 28 are rebroadcast to the BIOS agent 17A.

At operation 432, in response to the BIOS image 28 being complete, the BIOS agent applications 17A-17X update the current BIOSs 13A-13X with the new BIOS image 28. The BIOS agent applications 17A also send notification of the update to the manager computer 4. It should be appreciated that the BIOS agent applications 17A-17X will not acknowledge any network requests or instructions until the update is completed. The operational flow 400 then continues to operations 433 and 440. At operation 433, the BIOS agent applications 17A-17X reboot the computers 2A-2X with the new BIOS image 28 then return control to other operations at return operation 445. Reboot of the computers 2A-2X loads the updated BIOS 13 into the RAM 9. At operation 440, the manager computer 4 receives the notifications of the update. The operational flow 400 then continues to operation 442 where the status display is updated based on the notification of update. The operational flow then returns control to other operations at return operation 444. If a notification of update is not received from any of the computers 2A-2X, the manager computer interrogates the computers 2A-2X that have not acknowledged update status. If after a predetermined number of attempts at interrogating the computers without acknowledgement, the update operations for those computers or nodes are terminated.

It should be appreciated that security measures known in the art may be used to prevent unsecured access to update operations. For example, updates may be executed behind a secure firewall, authentication credentials may be implemented, and pipe communication ports may be utilized to control security.

Thus, the present invention is presently embodied as methods, systems, computer program products or computer readable mediums encoding computer programs for updating firmware within a plurality of computing devices over a network.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for updating firmware on a plurality of computing devices over a distributed network comprising:
   receiving from a manager computer over the distributed network at the plurality of computing devices, an instruction to execute a firmware maintenance procedure, the instruction received while executing an operating system;
   in response to receiving the instruction, rebooting the network attached computers to an operating system independent operating environment;
   receiving at the plurality of computing devices a new firmware image over the distributed network in the operating system independent operating environment; and
   in response to receiving the new firmware image, updating a current firmware on each of the plurality of computing devices with the new firmware image in the operating system independent operating environment.

2. The method of claim 1, wherein the plurality of computing devices comprise network attached computers and wherein the instruction to execute the firmware maintenance procedure is received from the manager computer by an agent application executing on each network attached computer in an operating system dependent state wherein the instruction comprises a single request sent in parallel to the network attached computers and wherein the method further comprises:
   in response to rebooting the network attached computers to the operating system independent operating environment, sending a notification of readiness to update from each network attached computer that rebooted to the operating system independent operating environment over the distributed network to the manager computer.

3. The method of claim 2, wherein updating the current firmware with the new firmware image comprises erasing the current firmware and copying the new firmware image to a memory location of each network attached computer.

4. The method of claim 2, wherein receiving the new firmware image comprises receiving the new firmware image in fragments over the distributed network, and wherein the method further comprises:
   receiving a broadcast status request prior to updating the current firmware;
   in response to receiving the broadcast status request, determining whether a rebroadcast of any fragment of the new firmware image is necessary;
   in response to determining that the rebroadcast of one or more fragments is necessary, sending a request for the rebroadcast of the fragments over the distributed network; and
   receiving the rebroadcast of fragments in response to sending the request.

5. The method of claim 4, wherein determining whether the rebroadcast of any fragments of the new firmware image is necessary comprises determining whether any fragments are missing or corrupted.

6. The method of claim 4, wherein the distributed network supports a user datagram protocol/Internet protocol and wherein a current firmware of each network attached computer is updated in parallel and wherein the request for rebroadcast includes numbers for the fragments requested or excludes numbers for the fragments requested.

7. The method of claim 2, further comprising monitoring a communication port of each network attached computer for the instruction to begin the maintenance procedure.

8. The method of claim 7, wherein each communication port of the network attached computers is monitored by the agent application that monitors instruction activity upon only one communication port and utilizes additional processor resources on the network attached computer only upon receiving the instruction.

9. The method of claim 2, further comprising:
   in response to updating the current firmware with the new firmware image, sending a notification of the update to the manager computer.

10. The method of claim 2, further comprising:
    determining whether a current firmware on each network attached computer is valid after being updated; and
    when it is determined that a current firmware is valid then rebooting each network attached computer having a current firmware that is valid.

11. The method of claim 2, wherein the firmware within each network attached computer comprises a BIOS of the network attached computer.

12. The method of claim 2, wherein the network attached computers comprise servers within a server farm.

13. The method of claim 2, wherein the network attached computers each comprise a node in a computer cluster wherein the computer cluster operates as a single system and wherein the manager computer comprises a cluster master control computer.

14. A computer-controlled apparatus capable of performing the method of claim 1.

15. A computer storage medium comprising computer executable instructions which, when executed by a computer, cause the computer to perform the method of claim 1.

16. A system for updating firmware of a plurality of network attached computers over a network, the system comprising:
    a first computer operative to:
       send an instruction to update the firmware of the network attached computers over the network; and
       send a new firmware image over the network to the network attached computers; and
    at least a second computer and a third computer comprising the network attached computers wherein each network attached computer is operative to:
       while in an operating system dependent state monitor a communications port for the instruction to update the firmware;
       in response to receiving the instruction, transition from the operating system dependent state to an operating system independent recovery state;
       in response to transitioning to the recovery state, receive the new firmware image while in the operating system independent recovery state; and
       in response to receiving the new firmware image, update a current firmware with the new firmware image while in the operating system independent recovery state.

17. The system of claim 16, wherein the first computer is further operative to receive notifications of readiness for update from the network attached computers wherein sending the new firmware image is in response to receiving the notifications of readiness and wherein each network attached computer is further operative to:

send at least one of the notifications of readiness to the first computer over the network wherein sending the at least one of the notifications of readiness is in response to transitioning to the recovery state.

18. The system of claim 16, wherein the first computer is further operative to broadcast a single new firmware image to update at least the second computer and the third computer in parallel over the network.

19. The system of claim 16, wherein the network supports a user datagram protocol/Internet protocol, wherein the new firmware image is received in fragments over the distributed network, and wherein the second computer and the third computer are further operative to:

prior to updating the current firmware and in response to receiving the new firmware image, receive a broadcast status request from the first computer; and in response to receiving the broadcast status request, identify any fragments of the new firmware image that are corrupted or missing;

in response to identifying one or more of the fragments that are corrupted or missing, send a request for the rebroadcast of the fragments identified over the network to the first computer; and in response to sending the request for rebroadcast of the fragments identified, receive the rebroadcast of the fragments.

20. The system of claim 16, wherein the second computer and the third computer are further operative to in response to updating a current firmware with the new firmware image, send a notification of the update over the network to the first computer and wherein the system further comprises a display device wherein the first computer is further operative to display update status messages via the display device.

21. The system of claim 16, wherein the firmware comprises a BIOS of the second computer and a BIOS of the third computer and wherein update of the firmware is asynchronously executed in an OS independent state of each network attached computer.

22. The system of claim 16, wherein the second computer and the third computer comprise nodes in a computer cluster operating as a single computing system and wherein the manager computer comprises a master control cluster computer.

23. A computer implemented method for maintaining a BIOS of a plurality of networked computers via a distributed network wherein the networked computers comprise nodes of a computer cluster operating as a single computing system, the method comprising:

receiving via the distributed network at each node, an instruction to update a BIOS on each node wherein the instruction comprises a single request broadcast to the nodes;

in response to receiving the instruction, transitioning the nodes to a recovery state wherein the recovery state comprises an OS independent operating environment;

receiving at the nodes a new BIOS image broadcast over the distributed network as a one image broadcast to all the nodes wherein the distributed network supports a user datagram protocol/Internet protocol; and in response to receiving the new BIOS image, updating a current BIOS on each of the nodes with the new BIOS image.

24. The computer implemented method of claim 23, the method further comprising:

monitoring a communication port of each network attached computer for the instruction to begin updating the BIOS.

25. The method of claim 24, wherein each communication port of the network attached computers is monitored by an agent application that monitors instruction activity upon only one communication port and utilizes additional processor resources on the network attached computer only upon receiving the instruction.

\* \* \* \* \*

UNITED STATES PATENT AND TRADEMARK OFFICE
CERTIFICATE OF CORRECTION

| | | |
|---|---|---|
| PATENT NO. | : 7,421,688 B1 | |
| APPLICATION NO. | : 10/770951 | |
| DATED | : September 2, 2008 | |
| INVENTOR(S) | : Stefano Righi, Brian Richardson and Jerry Petree | |

It is certified that error appears in the above-identified patent and that said Letters Patent is hereby corrected as shown below:

Beginning in Column 7, line 49, and ending with Column 7, line 50 should read:

... sition to a recovery state where the OS is neither executing or nor available.

Beginning in Column 10, line 52, and ending with Column 10, line 52 should read:

while in an operating system dependent state, monitor a

Signed and Sealed this

Twenty-seventh Day of July, 2010

David J. Kappos
*Director of the United States Patent and Trademark Office*